Oct. 7, 1958  T. BRENDEL  2,854,889
THREE-MEMBERED PHOTOGRAPHIC OBJECTIVE
Filed Aug. 31, 1954
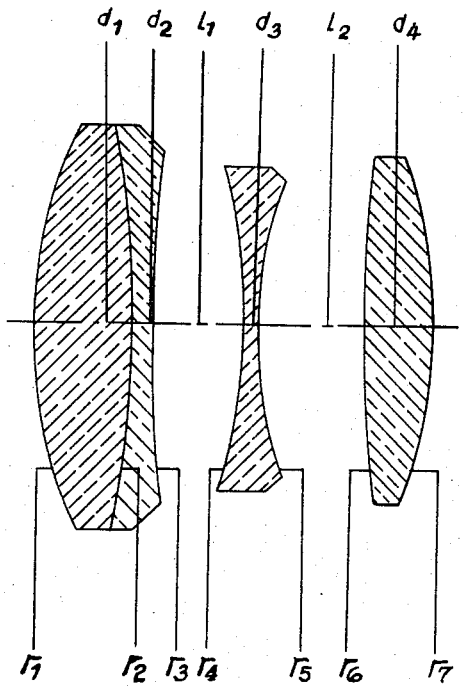
INVENTOR.
THEODOR BRENDEL
BY
Connolly and Hutz
HIS ATTORNEYS

United States Patent Office 2,854,889
Patented Oct. 7, 1958

2,854,889

THREE-MEMBERED PHOTOGRAPHIC OBJECTIVE

Theodor Brendel, Munich, Germany, assignor to Agfa Aktiengesellschaft, Leverkusen, Germany, a corporation of Germany Application August 31, 1954, Serial No. 453,361

Claims priority, application Germany September 18, 1953

4 Claims. (Cl. 88—57)

This invention relates to a photographic objective of the type having a minimum aperture ratio of 1:3.5 and an overall length less than 45% of the focal length of the objective. More specifically, the invention relates to an objective consisting of three components separated by air spaces in which the front component is a cemented component of positive total refractivity composed of a convergent and a divergent element having a convergent cemented surface, the absolute value of the radius of curvature of which amounts to at least 60% of the focal length of the objective, while the middle component is a biconcave divergent lens and the rear component is a biconcave convergent lens.

Objectives of this general type are known. Compared with objectives of the customary Tessar type they are of better shape from a manufacturing point of view because of the substantial reduction in the curvature of their cemented surface. Hitherto, however, they have been used to less extent than lenses of the Tessar type owing to the fact that in many cases they exhibit considerable residual aberrations.

The present invention is based on the observation that by precisely proportioning the characteristics of the elements in a predetermined manner, the simpler made objectives of the above-described type can be improved to such an extent that they exhibit the same excellent degress of correction as modern objectives of the Tessar type. This object is achieved according to the invention by observing the following stipulations:

(a) The refractive index ($n_3$) of the biconcave middle component, calculated in the D-line of the spectrum (587.6 m$\mu$), on one hand is at least 1.63 and on the other hand is at least 0.04 less than the arithmetic mean of the refractive indices of the positive element ($n_1$) of the cemented component and of the convergent rear component ($n_4$).

(b) The sum of the radii of curvature of the front surface ($r_1$) of the cemented component and of the rear concave surface ($r_5$) of the middle component is between 0.8 and 0.9 times the objective focal length ($f$), and also (c) The rear surface ($r_3$) of the cemented component is concave in a rearward direction and has a radius of curvature which amounts to at least 4 times and at most 10 times the radius of curvature of the front surface ($r_1$) of the cemented component.

The above described conditions (a), (b), (c) are expressed in the following representations:

(a) $\qquad 1.63 \leq n_3 \leq \dfrac{n_1+n_4}{2} - 0.04$ (b) $\qquad 0.8\, f \leq r_1 + r_5 \leq 0.9\, f$ (c) $\qquad 4\, r_1 \leq r_3 \leq 10\, r_1$ By the simultaneous fulfillment of these conditions it is possible, for an aperture ratio of 1:2.8, to maintain the longitudinal deviations of all marginal rays below 0.5% of the focal length of the objective and, for an image field of about 45°, to maintain the longitudinal deviations of the sagittal and meridional image points from the focusing plane for the optimum image center below 0.3% of the objective focal length. This will be readily understood by those skilled in the art to be a wholly unexpected beneficial result.

Moreover, the far-reaching removal of the comatic aberrations allows of a considerable widening of the channels for oblique rays in the case of the two external components of the objective and thus renders possible a reduction of the vignetting to an extent hitherto unknown with this type of objective. To achieve this object, the objectives of the present invention are provided with the following further characteristics:

(d) The axial thickness ($d_1$) of the convergent element of the cemented component amounts to at least 0.2 times the radius of curvature of the front surface ($r_1$) of the objective, but does not exceed 0.11 times the focal length ($f$) of the objective, and (e) The absolute value of the radius of curvature of the cemented surface ($r_2$) amounts to at least twice and at the most three times the radius of curvature of the front surface ($r_1$) of the objective.

The further conditions (d), (e) are represented by the following:

(d) $\qquad 0.2\, r_1 \leq d_1 \leq 0.11\, f$ (e) $\qquad 2\, r_1 \leq |r_2| \leq 3\, r_1$ The invention is illustrated in the accompanying drawing figure which is a diagrammatic section of an objective, the reference letters being described below.

The following numerical examples relate to a focal length $f = 1.0$. In these examples the radii are indicated by $r_1 \ldots r_7$, the axial thicknesses by $d_1 \ldots d_4$, the axial separating distances by $l_1$ and $l_2$, the refractive indices of the glasses, calculated on the D-line of the spectrum (587.6 m$\mu$), by $n_1 \ldots n_4$, and the Abbé numbers by $V_1 \ldots V_4$. The relative aperture ($f$) amounts to 1:2.8.

Example 1

| | | | |
|---|---|---|---|
| $r_1 = +0.42971$ | $d_1 = 0.09800$ | $n_1 = 1.69100$ | $V_1 = 54.8$ |
| $r_2 = -1.15325$ | $d_2 = 0.02100$ | $n_2 = 1.54869$ | $V_2 = 45.4$ |
| $r_3 = +3.06847$ | $l_1 = 0.08161$ | | |
| $r_4 = -0.59064$ | $d_3 = 0.01872$ | $n_3 = 1.63980$ | $V_3 = 34.6$ |
| $r_5 = +0.40928$ | $l_2 = 0.10640$ | | |
| $r_6 = +1.83931$ | $d_4 = 0.07046$ | $n_4 = 1.69100$ | $V_4 = 54.8$ |
| $r_7 = -0.48906$ | | | |

Example 2

| | | | |
|---|---|---|---|
| $r_1 = +0.45172$ | $d_1 = 0.09500$ | $n_1 = 1.71700$ | $V_1 = 47.9$ |
| $r_2 = -1.00000$ | $d_2 = 0.02300$ | $n_2 = 1.59551$ | $V_2 = 39.2$ |
| $r_3 = +2.47500$ | $l_1 = 0.08400$ | | |
| $r_4 = -0.59000$ | $d_3 = 0.01865$ | $n_3 = 1.65017$ | $V_3 = 33.7$ |
| $r_5 = +0.42923$ | $l_2 = 0.10300$ | | |
| $r_6 = +1.75040$ | $d_4 = 0.06500$ | $n_4 = 1.69100$ | $V_4 = 54.8$ |
| $r_7 = -0.47593$ | | | |

As many apparently widely different embodiments of this invention may be made without departing from the spirit and scope hereof, it is to be understood that this invention is not limited, except as defined in the appended claims.

What is claimed is:

1. A photographic objective of the type having a minimum aperture ratio of 1:3.5, and an overall length ranging between 27% and 44% of the focal length of the objective, comprising three components, separated by air spaces of which the front component is a cemented component in the form of a meniscus of positive total refractivity, composed of a convergent and divergent element and has a convex convergent cemented surface facing the interior of the objective, the absolute value of the radius of curvature of which amounts to at least 78% of the focal length of the objective, while the middle component is a biconcave divergent lens and the rear component is a biconvex convergent lens, wherein the following conditions are fulfilled and in which $r_1 \ldots r_7$ represent the radii of curvature of the individual surfaces, $n_1 \ldots n_4$ represent the refractive indices with respect to the D-line of the spectrum, and $f$ is the focal length of the objective:

(a) $$1.63 < n_3 < \frac{n_1 + n_4}{2} - 0.04$$

(b) $$0.8\ f < r_1 + r_5 < 0.9\ f$$

and (c) $$4.5\ r_1 < r_3 < 10\ r_1$$

2. A photographic objective as set forth in claim 1, characterized by the following additional conditions:

(d) $$0.2\ r_1 < d_1 < 0.11\ f$$

and (e) $$2\ r_1 < /r_2/ < 3\ r_1$$

3. A photographic objective having numerical data with all constructional factors progressively numbered proceeding in the direction towards the image plane substantially as follows:

[Focal length $f=1.0$  Relative aperture $f=2.8$.]

| | | | |
|---|---|---|---|
| $r_1=+0.42971$ | $d_1=0.09800$ | $n_1=1.69100$ | $V_1=54.8$ |
| $r_2=-1.15325$ | $d_2=0.02100$ | $n_2=1.54869$ | $V_2=45.4$ |
| $r_3=+3.06847$ | $l_1=0.08161$ | | |
| $r_4=-0.59064$ | $d_3=0.01872$ | $n_3=1.63980$ | $V_3=34.6$ |
| $r_5=+0.40928$ | $l_2=0.10640$ | | |
| $r_6=+1.83931$ | $d_4=0.07046$ | $n_4=1.69100$ | $V_4=54.8$ |
| $r_7=-0.48906$ | | | | in which $r_1 \ldots r_7$ represent the radii of curvature of the individual surfaces, $l_1$ and $l_2$ represent the air spacing between the individual lens elements, $d_1 \ldots d_4$ represent the thickness of the individual lens elements, $n_1 \ldots n_4$ represent the refractive indices for the glasses with respect to the D-line of the spectrum (587.6 mµ) and $V_1 \ldots V_4$ represent the Abbé numbers.

4. A photographic objective having numerical data with all constructional factors progressively numbered proceeding in the direction towards the image plane substantially as follows:

[Focal length $f=1.0$  Relative aperture $f=2.8$.]

| | | | |
|---|---|---|---|
| $r_1=+0.45172$ | $d_1=0.09500$ | $n_1=1.71700$ | $V_1=47.9$ |
| $r_2=-1.00000$ | $d_2=0.02300$ | $n_2=1.59551$ | $V_2=39.2$ |
| $r_3=+2.47500$ | $l_1=0.08400$ | | |
| $r_4=-0.59000$ | $d_3=0.01865$ | $n_3=1.65017$ | $V_3=33.7$ |
| $r_5=+0.42923$ | $l_2=0.10300$ | | |
| $r_6=+1.75040$ | $d_4=0.06500$ | $n_4=1.69100$ | $V_4=54.8$ |
| $r_7=-0.47593$ | | | | in which $r_1 \ldots r_7$ represent the radii of curvature of the individual surfaces, $l_1$ and $l_2$ represent the air spacing between the individual lens elements, $d_1 \ldots d_4$ represent the thickness of the individual lens elements, $n_1 \ldots n_4$ represent the refractive indices for the glasses with respect to the D-line of the spectrum (587.6 mµ) and $V_1 \ldots V_4$ represent the Abbé numbers.

References Cited in the file of this patent

UNITED STATES PATENTS

| 241,438 | Steinheil | May 10, 1881 |
| 721,240 | Rudolph | Feb. 24, 1903 |
| 1,826,362 | Merte | Oct. 6, 1931 |

FOREIGN PATENTS

| 291,916 | Germany | July 22, 1919 |
| 444,150 | Germany | May 24, 1927 |
| 544,329 | Germany | Mar. 24, 1932 |